(12) United States Patent
Zafiroglu et al.

(10) Patent No.: US 7,186,451 B2
(45) Date of Patent: Mar. 6, 2007

(54) COMPOSITE SHEET SUITABLE FOR USE AS ARTIFICIAL LEATHER

(75) Inventors: Dimitri Peter Zafiroglu, Centreville, DE (US); Stephen H. Tsiarkezos, Elkton, MD (US)

(73) Assignee: XYMID, LLC, Petersburg, VA (US)

( * ) Notice: Subject to any disclaimer, the term of this patent is extended or adjusted under 35 U.S.C. 154(b) by 280 days.

(21) Appl. No.: 10/403,254

(22) Filed: Mar. 31, 2003

(65) Prior Publication Data

US 2004/0192142 A1 Sep. 30, 2004

(51) Int. Cl.
*D04B 7/14* (2006.01)
*B32B 3/06* (2006.01)
*B32B 27/04* (2006.01)

(52) U.S. Cl. .......................... 428/102; 66/190; 66/191; 428/196; 428/219; 428/220; 428/904; 442/104; 442/361

(58) Field of Classification Search ................. 66/190, 66/191; 112/402, 413, 420, 438; 428/102, 428/196, 198, 219, 220, 904; 442/104, 352, 442/361, 362, 366, 415, 417
See application file for complete search history.

(56) References Cited

U.S. PATENT DOCUMENTS

| 4,073,988 A | | 2/1978 | Nishida et al. |
| 4,341,581 A | | 7/1982 | Civardi et al. |
| 4,876,128 A | * | 10/1989 | Zafiroglu .................... 428/102 |
| 5,256,429 A | | 10/1993 | Honda et al. |
| 5,707,710 A | | 1/1998 | Zafiroglu |
| 5,922,445 A | | 7/1999 | Yoshida et al. |
| 6,063,473 A | | 5/2000 | Zafiroglu |
| 6,407,018 B1 | | 6/2002 | Zafiroglu |

OTHER PUBLICATIONS

Kirk-Othmner Encyclopedia of Chemical Technology, vol. 15, "Leather-like Materials," pp. 177-192, (1995).

* cited by examiner

*Primary Examiner*—Jenna Befumo
(74) *Attorney, Agent, or Firm*—The H.T. Than Law Group

(57) ABSTRACT

The invention is directed to a composite sheet suitable for use as artificial leather or a precursor to artificial leather, where both surfaces have a napped or brushed appearance. The composite sheet comprises a low-density, lightly bonded non-woven web that is stitch-bonded and bulked such that the stitch-bonding yarns are not visible to the naked eyes without the need of post-processing steps to hide the yarns. The composite sheet may have binder resin(s) dispersed therein and activated.

31 Claims, 3 Drawing Sheets
(1 of 3 Drawing Sheet(s) Filed in Color)

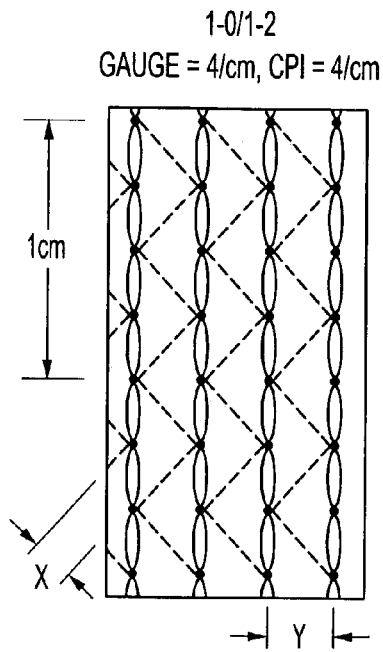
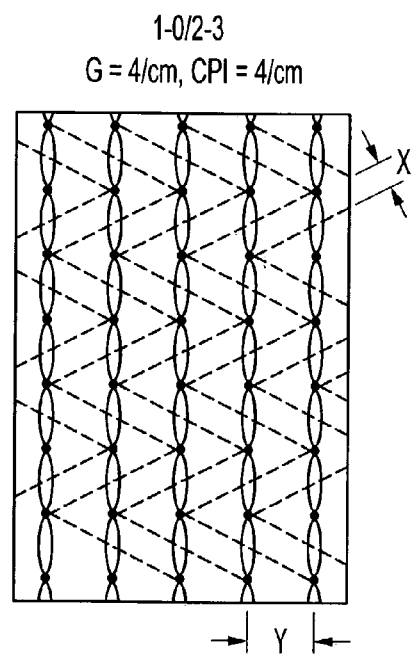
FIG. 3(a)   FIG. 3(b)
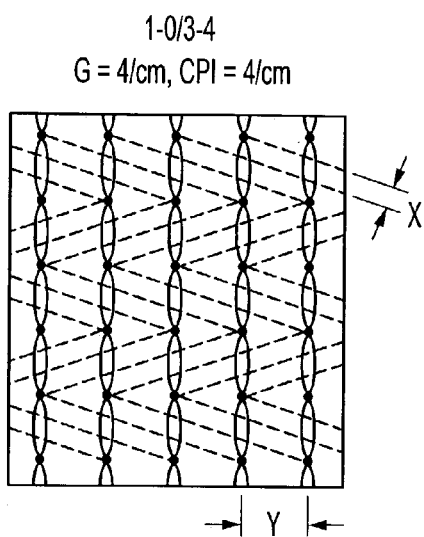
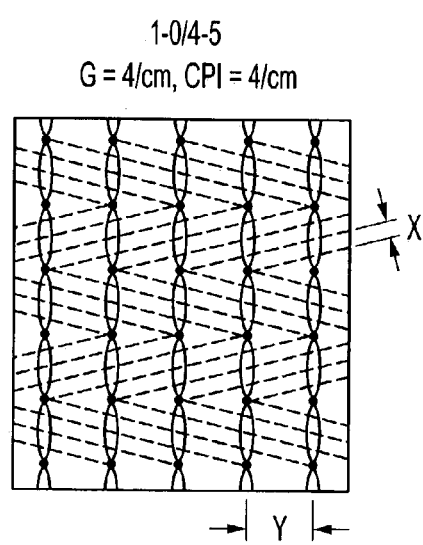
FIG. 3(c)   FIG. 3(d)

COMPOSITE SHEET SUITABLE FOR USE AS ARTIFICIAL LEATHER

FIELD OF THE INVENTION

This invention generally relates to a composite sheet suitable for use as artificial leather, coating substrate, insulative apparel and the like, and more particularly to a stitch-bonded composite sheet suitable for use as artificial leather or precursor to artificial leather, wherein the stitch-bonded yarns are not visible to the unaided eyes.

BACKGROUND OF THE INVENTION

Fabrics that are impregnated or coated with resins, especially polyurethane resin, are used in artificial leathers. Kirk-Othmer Encyclopedia of Chemical Technology, Fourth Edition, John Wiley & Sons, Inc., Volume 15, "Leather-like Materials" p. 177–192, (1995) summarizes the development of such materials. The encyclopedia notes that in the 1930s, a plasticized poly(vinylchloride) film coated onto a woven or knitted fabric was developed as a leather-like material, but the material was stiff, exhibited plasticizer migration and had extremely low permeability, poor flex endurance and a cold touch. In the 1960s, synthetic leather materials having improved appearance, feel and resistance to grain breakage were made by laminating a cast polyurethane film to a brushed fabric. Further improvements in flexibility were achieved with the introduction of poromeric polyurethane-coated fabrics which were produced by applying a solution of a polyurethane resin in an organic solvent to a brushed fabric and then immersing the fabric in a non-solvent bath (e.g., water) to coagulate the polyurethane and form the poromeric structure. Typically, a cast polyurethane film was applied atop the poromeric structure. Polyurethane-impregnated and coated nonwoven fabrics made with ultra-fine fibers or microfibers (i.e., of less than 0.3 denier) also were developed to produce suede-like and other leather goods.

Combinations of various woven or knitted fabrics with nonwoven materials also have been disclosed for use in making artificial leather. For example, U.S. Pat. No. 5,256,429, entitled "Composite Sheet for Artificial Leather," to Honda et al, discloses making a composite sheet by needle punching a surface layer of special staple fibers of very low denier into a tightly woven or tightly knit fabric of high twist multifilament yarn and then coating or impregnating the resulting structure with a binder. The special fibers are formed from "islands-in a-sea" composite fibers by dissolving the polymeric "sea" surrounding "islands" of a second polymer to leave fibers of very low titre (i.e., 0.001 to 0.1 denier). However, making artificial leather products from "islands-in-a-sea" fibers is costly.

U.S. Pat. No. 4,073,988, entitled "Suede-like Artificial Leathers and a Method for Manufacturing Same," to Neshida et al, discloses an artificial suede leather made from pile-like fibers by subjecting the fibers to a heat treatment and a swelling treatment before impregnating or coating the fibers with a synthetic polymer solution or emulsion. The solution or emulsion is then coagulated, and dried. The sheet is then buffed to raise naps. The filaments making up the pile-like fibers have complex cross-sections, created by bonding different polymers having mutually low adhesive affinity with each other. The artificial leather disclosed in '988 patent has only one surface that displays the leather-like appearance, while the other surface shows the fibers of the composite. This appearance reduces the appeal of artificial leather. Furthermore, an additional buffing step is required to produce raised naps.

U.S. Pat. No. 4,329,390, entitled "Method for Making Leatherlike Materials (B)," to Civardi et al discloses a synthetic leather-like sheet made from laminating a thin micro-porous elastomeric layer, a fibrous backing and a very thin preformed skin. The thin preformed skin is embossed to create a grain appearance. Again, this synthetic leather sheet only resembles leather on one surface.

U.S. Pat. No. 5,922,445, entitled "Composite Material and Process for Production of Same," to Yoshida et al discloses another leather-like composite sheet. The composite sheet is obtained by coating or impregnating a fibrous base material with an elastic polymeric substance, in which the fibers constituting the fibrous base material and the elastic polymeric substance are prevented from bonding with each other. This sheet may be produced by applying a hydrophobicizing treatment to the fibrous base material, then impregnating or coating a solution of the elastic polymeric substance to which a hydrophilic silicone has been added, and wet solidifying. Similarly, this synthetic leather composite sheet only resembles leather on one surface.

Recent advances in stitch-bonded composites suitable for use as artificial leather are disclosed in U.S. Pat. No. 5,707,710, entitled "Composite Sheet for Artificial Leather" to Zafiroglu, U.S. Pat. No. 6,063,473, entitled "Abrasion-Resistant Composite Sheet" also to Zafiroglu and U.S. Pat. No. 6,407,018 B1 (col. 5, 1. 47 to col. 6, 1. 13), entitled "Stitchbonded Fabric and Process for Making Same" to Zafiroglu. While these composites function well, the overlap yarns from the technical front and/or the underlap yarns from the technical back remain visible to the unaided eyes, as shown in FIGS. 1 and 2. Additionally, conventional composites can also have a rough or bumpy appearance that requires a post-processing brushing step to provide a more desirable combed or napped surface.

Hence, there remains a need in the art for artificial leather that in addition to having leather-like qualities also has an appearance that is closer to authentic leather.

SUMMARY OF THE INVENTION

Hence, the present invention is directed to a composite sheet suitable for use as artificial leather or as precursor to artificial leather wherein both surfaces resemble leather.

The present invention is also directed to a stitch-bonded web suitable to use as artificial leather wherein the stitch-bonding yarns are substantially invisible to the naked eyes.

The present invention is directed to a composite sheet comprising a dry-formed non-woven starting web having a density in the range of about 0.01 to about 0.10 gram/cm$^3$. The starting web is reinforced by shrinkable yarns stitch-bonded to the web, wherein the spacing between underlap yarns and the spacing between the overlap yarns are at least about 0.5 mm and wherein the web is contracted by at least about 20% in the machine and cross directions. The stitch-bonded yarns are covered by the fibers in the web.

Preferably, the starting web has a basis weight in the range of about 20 to about 60 grams/m$^2$. The dry-formed starting web can be a carded web, having a basis weight of about 50 grams/m$^2$ or less. Alternatively, the dry-formed starting web can be an air-laid staple web, having a basis weight of about 60 grams/m$^2$ or less. Alternatively, the starting web can be a filament web, which may be spunlaid or may comprise crimped filaments. The filaments may be crimped by differentially heating two sides of the filaments. The filaments may also be side-by-side bicomponent crimped filament yarns. The starting web can be bonded by a point bond pattern covering less than 15% of the surface of the starting web. The starting web may also be bonded by mechanical or hydraulic needling at a rate in the range of 20 to 150 penetrations per inch.

The spacings between underlap and overlap yarns are more preferably at least about 0.7 mm and most preferably at least about 1.0 mm. The starting web is preferably overfed during the stitch-bonding process by at least 15%. The stitch density is preferably between 2 per cm and 8 per cm in both the machine and cross directions The present invention is also directed to a composite sheet comprising an open random fibrous web and at least a first binder resin having a melting temperature lower than the melting temperature of the web fibers of the open random fibrous web. The open random fibrous web has a basis weight of less than about 50 grams/m$^2$ and a density between about 0.01 to about 0.10 gram/cm$^3$, and is reinforced by shrinkable yarns stitch-bonded to the web. The web is contracted by at least about 20% in the machine and cross directions, such that the stitch-bonded yarns are covered by the web fibers.

The composite sheet may further comprise a second binder resin. Preferably, the resins and the web fibers are co-dyeable. The total amount of binder resin makes up less than about 30% by weight of the composite sheet, more preferably less than about 20% by weight of the composite sheet.

The present invention is also directed to a process of making a composite sheet with unbonded starting web, comprising the sequential steps of (a) dry-forming the starting web having a basis weight of 60 grams/m$^2$ or less and a density between about 0.01 to about 0. 10 gram/cm$^3$, (b) supporting the starting web on a moving belt, (c) feeding the starting web to a stitch-bonding machine, wherein the starting web is being overfed by at least 15%, and (d) contracting the web by at least about 20% in the machine and cross directions, such that the stitch-bonded yarns are covered by the web fibers.

The dry-forming step can be a carding step, an air-laid step or a spinlaying step, which is a part of the spunbonding process.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

In the accompanying drawings, which form a part of the specification and are to be read in conjunction therewith and in which like reference numerals are used to indicate like parts in the various views:

FIGS. 3 and 4 are diagrammatic illustrations of exemplary stitching patterns suitable for use with the composite sheet in accordance to the present invention;

DETAILED DESCRIPTION OF THE PREFERRED EMBODIMENTS

Figure 1:
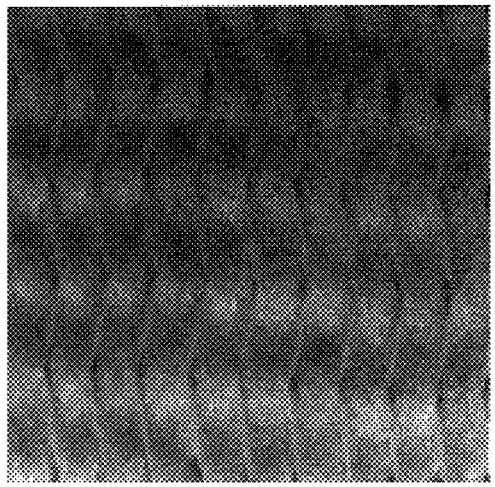
FIG. 1 is a photograph of the technical front side of a conventional composite sheet.
Figure 2:
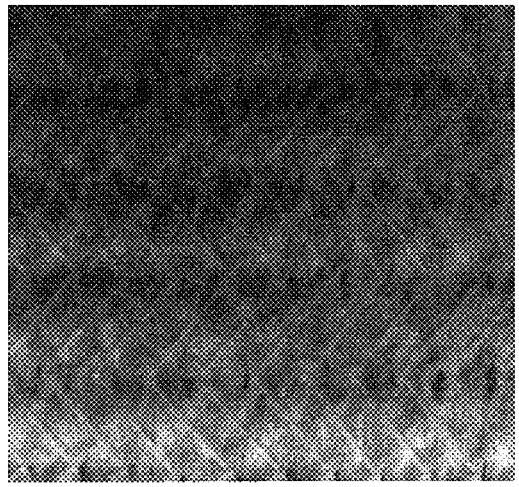
FIG. 2 is a photograph of the technical backside of the composite sheet shown in FIG. 1 showing the stitch-bonded support yarns.

As illustrated in the accompanying drawings and discussed in details below, the present invention is directed to improved artificial leather composites or precursor composites suitable for use with artificial leather that are flexible, light-weight and breathable and also have improved leather-like appearance. The present invention includes, but is not limited to, composites with binder resin(s) added to the starting web and composites without binders added.

In accordance with a preferred embodiment of the present invention, the inventive composite comprises a low density, non-woven starting web, which is stitch-bonded in a predetermined way such that as the web is folded and gathered after being stitch-bonded, the fibers in the web mesh with each other over the planar underlap and overlap yarns and "close over" these yarns to hide them from view. The starting web may be lightly bonded by needling at low energy levels without binder, or by a pattern of point bonds, or with a small amount of binder. The mechanical rearrangement of fibers by the penetrating action of the stitching needles, and subsequent stretch/recovery forces during web handling usually break the bonds and cause the fibers to "blossom" and cover yarn underlaps and overlaps. Gathering the product after stitching by allowing the stitched yarns to shrink further enhances the hiding of the yarns by the "blossomed" web fibers. The product acquires a uniform felted, napped or brushed look. The inventive composites are very flexible and soft, because the fibers are essentially hinged at the stitch insertion points. The stitch points are highly spaced apart to allow the fibers to buckle out of plane in both directions and exhibit a very high level of softness and flexibility, similar to highly-brushed knits, except that both top and bottom surfaces of the inventive composites are covered with soft nap. Preferably, the stitch pattern has at least about 0.5 mm spacings, designated as spacings X and Y in FIGS. 3 and 4, between the underlap yarns, discussed further below. More preferably, spacings are at least about 0.7 mm and most preferably at least about 1.0 mm.

The starting web is preferably made from low density, lightly bonded nonwoven webs, and more preferably from "dry-formed" webs of relatively bulky, crimped fibers. Webs made from staple fibers are typically crimped and bulky, and are preferred over webs made from filament fibers. Dry-formed webs typically include carded webs and air-laid staple webs. The preferred dry-formed webs comprise fibers of about 0.6 to about 3 deniers per filament. These webs have basis weight in the range of about 20 to about 60 grams/m$^2$, and density in the range of about 0.01 to about 0.02 grams /cm$^3$. Carded webs tend to have basis weight less than 50 grams/m$^2$, while air-laid webs in accordance to the present invention may have basis weight up to about 60 grams/m$^2$.

The starting web may be lightly bonded as discussed above, so long as the bonding process does not crush the web or increase its density. Solid resin low-melt binders may be blended into the web. The resin binders can be in fiber forms that are carded or air-laid along with the staple fibers, or the resin binders can form sheath around the staple fibers. Heat can be applied by using hot air, radiation, etc, to activate and bond the starting web without significantly reducing its density or thickness. The starting web may also be point tacked with a pattern of point bonds that cover a very small portion of its surface area, preferably under 15% of the surface and preferably with no heat or with sufficient heat to hold the web until the contraction step after stitch-bonding. The stitching needle action and subsequent mechanical "working" and/or gathering further loosen the web fibers. Alternatively, hydraulic needling or spunlacing can be performed using very low energy levels. The total resin present in this embodiment can be near 0% if low energy level hydraulic needling is used to lightly bond the starting web, or when a lightly bonded pattern is used for the same purpose. Webs of density and basis weight discussed herein have not been utilized in the art heretofore due to perceived instability and poor handling during stitching operation and also due to perceived poor surface stability after stitching.

The inventive composite may, optionally, comprise a low-density open random fibrous starting web with one or more binder resins intimately intermixed among the open random web fibers. At least some of the binder resins contained in the starting web may be pre-activated without pressure or compaction so that the web remains open and flexible. The web is then stitch-bonded and later contracted, preferably by heat. The heat first softens the pre-activated binder and then gathers the web allowing the fibers in the open random fibrous web to intermesh freely to cover the stitch-bonded yarns and create napped surfaces on the top and bottom of web.

Preferably, the open random fibrous starting web has density of about 0.04 gram/cm$^3$ or less, and a basis weight of about 50 grams/m$^2$ or less, more preferably less than about 0.025 gram/cm$^3$ and basis weight of about 30 grams/in$^2$ or less. Preferably, the open random fibrous webs are capable of contracting or bulking by at least 20% and more preferably at least 40% in both in the machine direction and in the cross direction (at least when heated) to buckle out of plane and emerge out of both the technical front and technical back sufficiently to intermesh and cover the yarn system. Suitable open random fibrous starting webs also include nonwoven webs described in column 5, lines 44–59 of the '473 patent. This portion of the '473 patent is hereby incorporated by reference herein in its entirety.

Open random fibrous starting webs include any construction where the fibers are separated and are not necessarily fully stacked in tight parallel form. Open random fibrous webs include most non-wovens made from staple or filament fibers, wherein individual fibers are, in general, spaced apart from each other by a distance approximately at least equal to the diameter or cross-section of the individual fibers to keep the density low. Keeping the density low and the spaces open will also allow the optimal insertion of resins or adhesives in fine forms, such as fibers, powders, pulps, fibrids, fibrils between the fibers. Examples of these open random fibrous non-wovens include, but are not limited to, needlepunched, spunlaced, simple carded airlaid or spunlaid webs. Continuous filament/spunlaid webs should be collected in a manner that does not compact the product to cause it to lose its bulk. Preferably, the product has some crimp generated by the use of differential heat treatment on the two sides of the filament, by mixing fibers of two different shrinkage levels, by using side-by-side bicomponent fibers, etc.

As discussed above, the composite of the second embodiment may further comprise binder resin(s) in fibrous, fibril or powdered form intimately intermixed among the fibers the open random fibrous starting web. The resin may also be the sheath disposed around the core of the staple fibers in the open random fibrous webs to ensure that the resin is intimately intermixed within the fibrous webs. In accordance to one aspect of the present invention, the resin is activated in situ in the composite. According to one embodiment, at least two resins with different melting points are used in the composite. The resins are preferably incorporated in the open fibrous web before any other processing steps. In a first heating step, a first resin with the lower melting point is activated and the second resin is preferably tacked to hold the resins in place preferably at the top of the fibrous web, so that in subsequent manufacturing steps the resins are not dislodged and migrate toward the center or bottom of the web. Subsequent manufacturing steps include, but not limited to, stitch-bonding and/or contraction to increase the density of the web. After stitch-bonding is completed, a second heating step preferably bulks the web and activates the remaining resins to form a resin-fiber rich layer on top of the composite. This construction requires relatively less resin when compared to the prior art, such as the '473 patent. In this embodiment, less than 30% by weight of total resins is utilized in the composite.

Suitable polymeric resins include, but are not limited to, polyesters, nylon, polyamides, epoxies, synthetic rubbers, polyacrylates polyethers, polyetheresters, polyurethanes, copolymers and mixtures thereof and the like. The resins are preferably thermoplastic. Preferably, the resins are co-dyeable with the open random fibrous webs, so that the composite sheets may retain the same color even when it is worn. Also preferably, the resins are inexpensive and are easy to handle during manufacturing. Resins can be formed integral to the fibers of the open random fibrous webs. For example, resins can form the lower melting sheath and the fibers can form the higher melting core. Resins in fine forms, e.g., powder, short fibers, fibrils or pulps, can also be incorporated into the open random fibrous webs by sifting, sprinkling or aqueous solution so long as the solid particles remain on the webs after drying. Preferably, when fine form resins are used the resins remain on or near the top of the webs. It is unnecessary for the fine form resins to impregnate the entire thickness of the open random fibrous webs. This avoids the unnecessary stiffness to the composite caused by having the resin proceed throughout the composite and later activated.

In accordance to one embodiment of the present invention, a low-melting thermoplastic resin is used. Preferably, the lower melting resin is formed as the sheath to the fibers in the open random fibrous web, or alternatively the higher melting resin is formed as the sheath.

Preferably, a heating step heat is applied to the low-density resin and open random fibrous web, so that as the resin melts and helps reinforcing the open random fibrous web. Afterward, the random fibrous webs are reinforced by a network of shrinking stitched yarns.

In accordance to another aspect of the invention, the composite may comprise an optional thin densified skin of resin and fibers formed on top of the composite web, as illustrated in Example 3. This thin densified skin can be formed when the second heating step is applied with pressure, or can be formed after the second heating step. The activation of resin within the composite follows a gradient having higher resin activation on the top of the composite and lower resin activation toward the bottom of the composite to improve the flexibility of the composite. Preferably, the resins are selected so that the resins can be dyed along with the fibers so that as the composite is worn during use, the color of the composite remains the same throughout its useful life. Additionally, the resins are preferably thermoplastic polymers.

In accordance to another aspect of the present invention, the stitch-bonding yarns are elastomeric yarns, bi-component yarns, partially oriented yarns (POY), heat shrinkable yarns, which include, but are not limited to, textured yarns. The stitch frequency is preferably smaller than 20 per inch (or 8 per centimeter) to allow space between stitches for the fibers in the open random fibrous web to emerge. Preferably, the stitch frequency is between about 2 per centimeter and about 8 per centimeter. The stitch patterns preferably do not involve dense long underlaps that block the fibers from emerging on the technical backside. Suitable stitch patterns include those used in the Examples below and preferably patterns with shorter floats that do not go across many wales with a low frequency of stitches per inch. Shorter floats and smaller gages and stitch frequency are preferred.

Figure 4A:
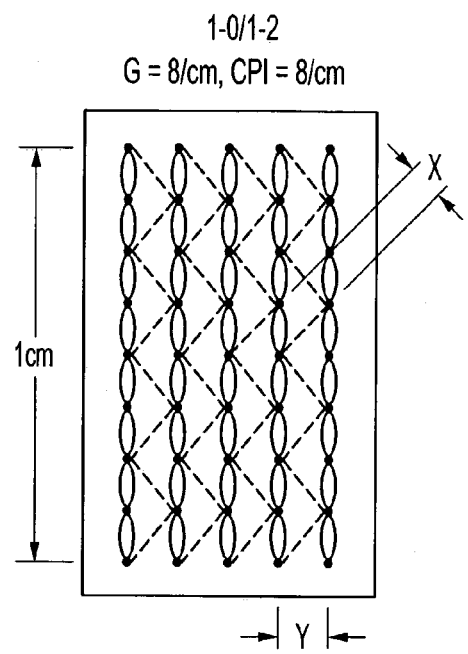
Figure 4B:
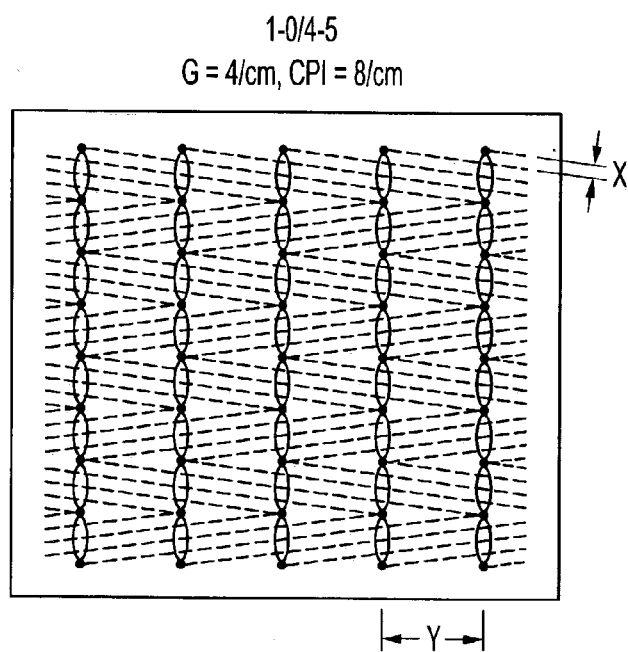

FIGS. 3 and 4 illustrate some exemplary stitching patterns usable with the present invention. FIGS. 3(a)–3(d) show a chain and tricot stitching pattern with a 4/cm gauge and stitch frequency (CPI) of 4/cm. The spacing Y is about 2.5 mm, and the spacing X is about 1.77 mm, 1.11 mm, 0.78 mm and 0.65 mm, respectively. FIGS. 3(a)–3(d) show a 1-0/1-2, 1-0/2-3, 1-0/3-4 or 1-0/4-5 pattern, respectively. Spacing X, as shown, is defined as the spacing between the needle placements with respect to the underlap yarns or the spacing between the underlap yarns, and likewise spacing Y is the space between the overlap yarns. Spacings X and Y allow the fibers in the starting web to buckle out-of-plane efficiently to cover the stitch-bonding yarns. Preferably, spacings X and Y are at least about 0.5 mm to allow sufficient space for the fibers in the starting web to buckle and cover the stitch-bonding yarns. More preferably, spacings X and Y are at least about 0.7 mm, and most preferably at least about 1 mm. FIG. 4(a) shows a 1-0/1-2 chain/tricot stitch pattern with 8/cm gage and CPI of 8/cm, and FIG. 4(b) shows a 1-0/4-5 chain/tricot stitch pattern with 4/cm gage and CPI of 8/cm. Other stitch patterns are also suitable with the present invention and the present invention is not limited to the chain/tricot stitch pattern shown herein, so long as spacings X and Y are sufficient to allow web fibers to buckle.

Other non-limiting stitching patterns include the Jersey stitch and its variations, the Delaware stitch and its variations, the Teffeta stitch and its variations, disclosed in U. S. Pat. No. 4,026,130, entitled "Method of Warp Knitting," and issued on May 31, 1977. Other suitable stitching patterns are disclosed in U.S. Pat Nos. 4,015,451, 5,542,269, 5,557,950, and 5,619,869 among others. Combined stitches from two bars preferably utilize stitches knitting in the same direction, e.g., 1-0/2-3 and 1-0/3-4, to allow more space. Crossing stitches, e.g., 1-0/2-3 and 3-4/1-0, can also be used if the gauge and CPI are wide as illustrated in Examples 2 and 3, below.

In accordance to another aspect of the present invention, to provide a napped appearance to the composite, the web is stretched after being stitched to loosen the web before contraction or bulking. Stretching in the machine and cross directions is preferred when bare elastomeric or POY stitching yarns are used in the stitching such that stretching beyond the stitched dimensions is allowed. Stretching in the cross-direction is suitable when covered elastomeric or textured stitching yarns are used and the stitch frequency is low, e.g., under about 4/cm, and the underlaps go over only a few wales, e.g., up to 2 or 3 wales.

After the reinforcement step, preferably by stitched shrinkable yarns the resin-web is buckled or contracted to increase its density. Contraction and buckling of the web, if the web is a fibrous nonwoven layer, can be accomplished in several ways. Contractible yarns are intermittently stitched to the random fibrous web. The spacing between attachment locations, i.e., spacing Y, is typically about 1 mm to allow for efficient buckling. Then, the element or array of elements is caused to contract so that the area of the random fibrous web is decreased significantly and groups of fibers buckle out of plane. Before the contractible elements are attached, additional gathering or contraction can be imparted to the starting fibrous nonwoven layer in the machine direction by over-feeding the layer to the apparatus being employed to attach the contractible elements.

Many types of contractible yarns are suitable for use in the present invention. For example, the random fibrous nonwoven web can be stitch-bonded with elastic yarns under tension. Textured stretch yarns, covered or bare spandex yarns and the like are suitable yarns for contractible element stitching. After the stitching, the tension can be released to cause the desired contraction and buckling of the random fibrous web. In addition to stitching, extended elastic elements in the form of warps, cross warps, films or the like, can be intermittently attached to the random fibrous web. Thereafter, tension on the extended elements can be released to cause the desired contraction and buckling of the web.

Other types of contractible elements, which shrink on being treated with heat, moisture, chemicals or the like, can be introduced into the stitched web without initial tension or extension in the elements. After attachment, the contraction of the contractible elements can be activated by appropriate treatment.

As used herein, the basis weight or unit weight of a fabric or fibrous layer is measured according to ASTM Method D 3776-79. Thickness is measured by a thickness gage having a foot with a diameter of 1 inch, which applies a pressure of only 5 grams to the substrate. The density of the resin-impregnated fabric is determined from its unit weight and its measured thickness.

The over-feed ratio, contraction ratio and total gather are parameters reported herein which measures of how much an initial fibrous layer contracts or gathers as a result of the operations to which the layer is subjected. The over-feed ratio is defined as the ratio of the initial area of a starting fibrous nonwoven layer to the area of the layer immediately up-stream of a first processing step (e.g., a stitch-bonding step). Over-feed causes buckling, gathering or compression of the nonwoven layer in the machine direction in which it is being fed to the operation.

The contraction ratio is a measure of the amount of further contraction the nonwoven layer undergoes as a result of the specific operation to which it is subjected (e.g., stitch-bonding, release of tension from yarns to which the fibrous layer was intermittently attached). The contraction ratio is defined as the area of the fibrous layer as it enters the specific operation divided by the area of the fibrous layer as it leaves the specific operation. The total gather is defined as the product of the over-feed and contraction ratios. The fraction of original area is the reciprocal of the total gather and is equivalent to the ratio of the final area of the fibrous layer to the initial area of the starting fibrous layer.

The flexing endurance of the samples is based on the IUF 20 method of International Union of Leather Chemists Association using a Bally Flexometer (Bally SchuhFabriken AG, Schoenenwerd, Switzerland). The composite specimens (65 mm. by 40 mm.) were flexed and examined for damage after a predetermined number flexes. The number of cycles at which 10 or more small cracks first appeared in the specimen was recorded. Typically, a minimum of 10,000 flexes under dry conditions without 10 or more small cracks is considered acceptable.

EXAMPLES

Example 1

A web emerging from a card or air-lay system is lightly bonded by a low level of mechanical needling (needlepunching), in the range of 5–50 penetrations per inch to give the web sufficient cohesion for normal handling, e.g. transportation or feeding the web into a stitch-bonding machine, without over-densifying it. The web can also be point-tacked with a pattern of light bonds that cover a very small portion of its surface area, preferably under 15% and with no heat, or with sufficient heat to hold the shape of the web and still allow it to disintegrate when stitch-bonded and bulked. Hydraulic needling (spunlacing) can also be performed using very low energy levels (low impact and low energy such as less than 5 hp·hr/lb). The lightly bonded web then can be stitch-bonded and bulked as described in the Examples below. The web is overfed by at least 15% during the stitch-bonding process.

The carded webs or air-laid webs can also be directly fed into the stitch-bonding machine without being bonded at all. In such instances, the web preferably has basis weight up to 60 grams/m² for end uses requiring high surface fiber density, such as artificial leather applications. One example is to feed this non-bonded starting web supported by a moving belt to a stitch-bonding machine that runs at about 1200–1600 rpm with a stitch frequency of 4/cm or 4m/minute and with the web being overfed by 30% or at 5.2 meters/minute. With this basis weight, the rate of web feed becomes 300 grams per minute per meter width, or approximately 1.0 lbs/inch·hr. The stitch-bonding and the bulking are discussed in the Examples below.

Open Random Web:
  Polyester staple fibers type 90-S, 0.9 denier per filament and 1.5 inch long were carded, cross-lapped and lightly needle-punched with 30 penetrations per square inch and drawn into a very lightly entangled web having a basis weight of about 50 g/m². Web thickness is about 1.8 mm and its density is about 0.03 g/cm³.

Resins:
  None.

First Heating Step:
  None.

Reinforcement Step:
  The web was overfed at about 25% into a 14 gauge (5.5 stitches/cm) stitch-bonding machine (spacing Y is about 1.8 mm) stitching 150 denier/34 filament POY polyester yarns, commercially available from Unify U.S., at 9 CPI (3.54/cm) using a 1-0/2-3 stitching pattern. The X spacing is about 1.1 mm. The overlap and underlap yarns are partially hidden, but remain visible.

Contraction:
  The stitched web was overfed into a tenter frame by 20% in the machine direction and heated to 190° C. while it was expanded or stretched by 20% in the cross direction and then allowed to cross shrink by 40%, resulting in a net 20% cross-contraction in addition to the 20% machine direction contraction. Total time spent in the tenter frame was about 4 seconds.

Appearance:
  The final web was heat-set, soft and flexible with two smooth faces hiding fully all overlap and underlap yarns. The final basis weight is 155 g/m² and the final thickness is 2.4 mm.

Example 2

Open Random Fibrous Web:
  Carded web consisting of a blend of 90% of 4 denier/filament ("dpf") sheath/core polyester and 10% of 6 dpf high melt staple polyester. The sheath/core polyester comprises 50% sheath with a melting temperature of 110° C., and 50% core with a melting temperature of 235° C. The basis weight of the carded web is about 23 g/m² with a thickness of about 1.1 mm and a density of about 0.021 g/cm³.

Resins:
  The first resin is the polyester sheath of the sheath/core component of the open random fibrous web with a melting temperature of 110° C.
  The second resin is a polyester powder with a melting temperature of 126° C. sifted onto the open random fibrous web ("resin-fiber web").

First Heating Step:
  The resin-fiber web was run through a chamber heated to approximately 120° C. for about 5 seconds to melt the first resin and tack the second resin.
  The resin-fiber web comprises about 19% polyester sheath first resin, about 19% polyester core fiber, 57–58% polyester powder second resin, and 4% 6-dpf polyester staple fiber. The basis weight of the resin-fiber web after the first heating step is about 61 g/m².

Reinforcement Step:
  The partially bonded resin-fiber web was stitch-bonded on a 150-inch wide Liba stitch-bonding machine using two bars at 14 gauge and 14 courses per inch (CPI). The back bar stitches a high-tenacity textured polyester yarn of 220 denier/50 filaments in a 3-4/1-0 repeating stitch pattern. The front bar stitches 280 denier Lycra® yarn air tangled with 70 denier textured polyester in a 1-0/2-3 repeating stitch pattern. The resin-fiber web was overfed at 29%. Spacing Y is about 1.8 mm and spacing X is about 0.56 mm for the texture polyester yarns and about 0.84 mm for the Lycra yarns.
  The stitch-bonded resin-fiber web has a basis weight of about 160 g/m², and comprises about 3% of the first resin, 20% of the second resin, 10% total 6-pdf and core polyester fibers and 67% total stitch-bonded yarns. The overall resin content in the stitch-bonded resin-fiber web is only about 23% of the total weight, and about 70% of the top fibrous surface. Hence, while the total resin percentage is low, i.e., less than 30%, the top fibrous surface remains resin-fiber rich.

Contraction/Bulking (Second Heating) Step:
  The stitch-bonded resin-fiber web was then processed through a textile tenter frame at about 190° C. for about 30 seconds. The web contracted about 2.3 times in both the machine direction and the cross direction. The final composite's basis weight is about 850 g/m² and a final thickness of about 2.04 mm. The final density is about 0.41 g/cm³ based on the entire structure, and is about 0.19 g/cm³ based on the structure without the stitch-bonding yarns.

Figure 5:
FIG. 5 is a photograph of the technical front side of a composite sheet in accordance to the present invention.
Figure 6:
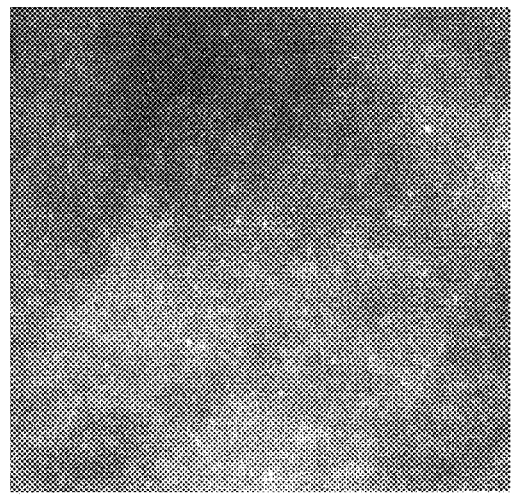
FIG. 6 is a photograph of the technical backside of the composite sheet in accordance to the present invention shown in FIG. 6.

Appearance:
  Samples made in accordance to Example 2 can withstand at least 15,000 cycles using the Bally Flex method and an observer could not see the overlap or underlap stitching yarns. An example is illustrated in FIGS. 5 and 6. As shown, the stitching yarns cannot be seen with unaided eyes. These samples are very flexible and resemble a fine felt, and can be used as artificial leather or a precursor for artificial leather.

Example 3

Open Random Fibrous Web:
  Same as Example 2.

Resins:
  Same as Example 2, except that the amount of the second polyester resin is increased by about 30%.

First Heating Step:
  Same as Example 2.
  The resin-fiber web comprises about 16% polyester sheath first resin, about 16% polyester core fiber, 63–64% polyester powder second resin, and 4% 6-dpf polyester staple fiber. The basis weight of the web with the resins after the first heating step is about 75 g/m². The thickness of the web is about 1.2 mm before reinforcement, and the density is about 0.063 g/cm³.

Reinforcement Step:
  Same as Example 2, with the yarn feed reset to accommodate a bulkier nonwoven. Yarn consumption was higher than Example 2.
  The basis weight is about 260 g/m², and comprises about 5% of the first resin, 21% of the second resin, 8% total of 6-dpf and core polyester fibers and 68% of stitch-bonded yarns. The overall resin content in the stitch-bonded resin-fiber web is only about 26% of the total weight of the composite, and about 81% of the top fibrous surface. Hence, similar to Example 2, while the total resin percentage is less than 30%, the top fibrous surface remains rich in resin and fiber.

Contraction/Bulking (Second Heating)Step:
  Same as Example 2.
  The final composite's basis weight is about 1152 g/m² and a final thickness of about 2.93 mm. The final density is about 0.41 g/cm³ based on the entire structure, and is about 0.13 g/cm³ based on the structure without the stitch-bonding yarns.

Appearance:
  Samples made in accordance to Example 2 can withstand at least 15,000 cycles using the Bally Flex method, and an observer could not see the overlap or underlap stitching yarns. These samples are very flexible and resemble a fine felt, and can be used as artificial leather or a precursor for artificial leather.

Optional Hot Press Step:
  The contracted composite was pressed by a hot press from one side only at 220° C. for about 1 second with a set gap of 2.0 mm. This hot-pressed composite has a final thickness of 1.6 mm and a thin densified skin, as discussed above.

Example 4

Open Random Fibrous Web:
  Carded web consists of sheath/core polyester 4 dpf fibers. The first sheath/core fibers make up 80% of the web, and its polyester (PET) sheath has a melting temperature of 180° C., and the second sheath/core fibers make up 20% of the web and its polyester (PET) sheath has a melting temperature of 110° C. The core has a melting temperature of 225° C. The first sheath/core fibers comprise 40% sheath and 60% core. The second sheath/core fibers comprise 50% sheath and 50% core. The basis weight of the carded web is about 26 g/m².

Resins:
  The first resin is the PET sheath of the second sheath/core with melting point of 110° C.
  The second resin is the PET sheath of the second sheath/core with melting temperature of 180° C.

First heating Step:
  The resin-fiber web was run through a chamber heated to approximately 120° C. for about 5 seconds to melt the first resin and tack the second resin.
  The resin-fiber web comprises about 42% PET resins and about 58% polyester staple fibers, and has a relatively low basis weight of about 26 g/m². The thickness of the web is about 0.9 mm and its density is about 0.029 g/cm³.

Reinforcement Step:
  The partially bonded resin-fiber web was stitch-bonded on 150-inch Liba stitch-bonding machine at 14 gauge and 14.2 CPI on a single bar. The bar stitches a 280 denier Lycra® covered with 70 denier/34 filaments textured polyester in a 1-0/2-3 repeating stitch pattern. The resin-fiber web was overfed at 32%. Spacing Y is about 1.8 mm and spacing X is about 0.84 mm.
  The stitch-bonded resin-fiber web has a basis weight of about 80 g/m², and comprises about 19% of the first and second PET sheath resin, 21% polyester core staple fibers and 60% total stitch-bonded yarn. The overall resin content in the stitch-bonded resin-fiber web is only about 19% of the total weight, and about 60% of the top fibrous surface.

Contraction/Bulking (Second Heating) Step:
  The stitch-bonded resin-fiber web was then processed through a textile tenter frame at about 190° C. for about 30 second. The web contracted about 67% in the machine direction and 67% in the cross direction. The final composite's basis weight is about 763 g/m² and a final thickness of about 2.87 mm. The final density is about 0.265 g/cm³ based on the entire structure, and is about 0.11 g/cm³ based on the structure without the stitch-bonding yarns.

Appearance:
  These samples are very flexible and resemble a fine felt, and can be used as artificial leather or a precursor for artificial leather.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A composite sheet comprising a dry-formed non-woven starting web having a density in the range of about 0.01 to about 0.10 gram/cm³, said starting web is reinforced by shrinkable yarns stitch-bonded to the web, wherein the spacing between underlap yarns and the spacing between the overlap yarns are at least about 0.5 mm and wherein the web is contracted by at least about 20% in the machine and cross directions, such that the stitch-bonded yarns are covered by the fibers in the web, wherein the starting web is bonded by a point bond pattern, said pattern covers less than about 15% of the surface of the starting web.

2. The composite sheet of claim 1, wherein the starting web has a basis weight in the range of about 20 to about 60 grams/in².

3. The composite sheet of claim 1, wherein the stitch density is between 2 per cm and 8 per cm in both the machine and cross directions.

4. The composite sheet of claim 1, wherein the spacings between underlap and overlap yarns are at least about 0.7 mm.

5. The composite sheet of claim 4, wherein the spacings are at least about 1.0 mm.

6. The composite sheet of claim 1, wherein the dry-formed staffing web comprises carded web.

7. The composite sheet of claim 6, wherein the carded web has a basis weight of about 50 grams/in$^2$ or less.

8. The composite sheet of claim 1, wherein the dry-formed staffing web comprises air-laid staple web.

9. The composite sheet of claim 8, wherein the air-laid web has a basis weight of about 60 grams/m$^2$ or less.

10. The composite sheet of claim 1, wherein the staffing web is overfed during the stitch-bonding process by at least about 15%.

11. The composite sheet of claim 1, wherein the staffing web is bonded by mechanical or hydraulic needling at a rate in the range of 20 to 150 penetrations per inch.

12. The composite sheet of claim 1, wherein the staffing web is a filament web.

13. The composite sheet of claim 12, wherein the filament web comprises crimped filaments.

14. The composite sheet of claim 13, wherein the filaments are crimped by differentially heating two sides of the filaments.

15. The composite sheet of claim 12, wherein the filament web is spunlaid.

16. The composite sheet of claim 12, wherein the filament web comprises side-by-side bicomponent crimped filament yarns.

17. The composite sheet of claim 1, wherein the stitched bonded yarns are covered by the fibers on both the upper and lower surfaces.

18. The composite sheet of claim 1, wherein the density of the staffing web is less than about 0.065 gram/cm$^3$.

19. The composite sheet of claim 18, wherein the density of the staffing web is less than about 0.04 gram/cm3.

20. A composite sheet comprising an open random fibrous web and at least a first binder resin having a melting temperature lower than the melting temperature of the web fibers of the open random fibrous web, wherein the open random fibrous web has a basis weight of less than about 50 grams/in2 and a density between about 0.01 to about 0.10 gram/cm$^3$ and is reinforced by shrinkable yarns stitch-bonded to the web, and wherein the web is contracted by at least about 20% in the machine and cross directions, such that the stitch-bonded yarns are covered by the web fibers, wherein the total amount of binder resin makes up less than 23% or less by weight of the composite sheet.

21. The composite sheet of claim 20, wherein the first binder resin forms a part of the cross-section of the web fibers.

22. The composite sheet of claim 20, wherein the first binder resin is applied in a powder form to the open random fibrous web.

23. The composite sheet of claim 20, wherein the binder resin and the web fibers are co-dyeable.

24. The composite sheet of claim 18, wherein the total amount of binder resin makes up about 20% or less by weight of the composite sheet.

25. The composite sheet of claim 20, wherein the stitched bonded yarns are covered by the fibers on both the upper and lower surfaces.

26. The composite sheet of claim 20, wherein the density of the staffing web is less than about 0.065 gram/cm$^3$.

27. The composite sheet of claim 26, wherein the density of the staffing web is less than about 0.04 gram/cm$^3$.

28. A composite sheet comprising an open random fibrous web and at least a first binder resin having a melting temperature lower than the melting temperature of the web fibers of the open random fibrous web, wherein the open random fibrous web has a basis weight of less than about 50 grams/in$^2$ and a density between about 0.01 to about 0.10 gram/cm$^3$ and is reinforced by shrinkable yarns stitch-bonded to the web, and wherein the web is contracted by at least about 20% in the machine and cross directions, such that the stitch-bonded yarns are covered by the web fibers, wherein the fibrous web is overfed during the stitch-bonding process by at least 15%.

29. A composite sheet comprising: an open random fibrous web and at least a first binder resin having a melting temperature lower than the melting temperature of web fibers of the open random fibrous web, wherein the open random fibrous web has a basis weight of less than about 50 grams/in$^2$ and a density between about 0.01 to about 0.10 gram/cm$^3$ and is reinforced by shrinkable yarns stitch-bonded to the web, and wherein the web is contracted by at least about 20% in the machine and cross directions, such that the stitch-bonded yarns are covered by the web fibers, wherein the composite sheet further comprises a second binder resin, wherein the melting point of the second binder resin is lower than the melting point of the web fibers and higher than the melting point of the first binder resin.

30. The composite sheet of claim 29, wherein the second binder resin forms a part of the cross-section of the web fibers.

31. The composite sheet of claim 29, wherein the second binder resin is applied in a powder form to the open random fibrous web.

* * * * *